(12) United States Patent
Yeh

(10) Patent No.: US 7,670,202 B2
(45) Date of Patent: Mar. 2, 2010

(54) FOAM PRODUCT

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 38 days.

(21) Appl. No.: 12/071,728

(22) Filed: Feb. 26, 2008

(65) Prior Publication Data

US 2008/0146101 A1 Jun. 19, 2008

Related U.S. Application Data

(63) Continuation-in-part of application No. 11/717,631, filed on Mar. 14, 2007, now Pat. No. 7,416,461, which is a continuation-in-part of application No. 11/271,920, filed on Nov. 14, 2005, now Pat. No. 7,201,625.

(51) Int. Cl.
*B63B 1/00* (2006.01)
(52) U.S. Cl. .......................... 441/65; 441/74
(58) Field of Classification Search .................. 441/65, 441/68, 74; 280/610; 428/71, 76
See application file for complete search history.

(56) References Cited

U.S. PATENT DOCUMENTS

| | | | |
|---|---|---|---|
| 4,457,729 A | 7/1984 | Peerlkamp | |
| 4,693,856 A | 9/1987 | Ruben et al. | |
| 4,731,038 A * | 3/1988 | Hancock et al. | 441/68 |
| 4,767,369 A | 8/1988 | Snyder | |
| 4,850,913 A | 7/1989 | Szabad, Jr. | |
| 4,961,715 A | 10/1990 | Shanelec | |
| 5,211,593 A | 5/1993 | Schneider et al. | |
| 5,217,660 A | 6/1993 | Howard | |
| 5,658,179 A | 8/1997 | Glydon et al. | |
| 5,718,968 A | 2/1998 | Cutler et al. | |
| 6,210,613 B1 | 4/2001 | Stein et al. | |
| 6,241,926 B1 | 6/2001 | Cutler | |
| 6,492,000 B1 | 12/2002 | Matsuki et al. | |
| 6,620,357 B2 | 9/2003 | Bruning et al. | |
| 6,908,351 B2 | 6/2005 | Burke | |
| 6,955,576 B2 | 10/2005 | Yeh | |
| 7,083,173 B2 * | 8/2006 | Lehr et al. | 441/79 |
| 7,201,112 B2 | 4/2007 | Jolley | |
| 2004/0176001 A1 | 9/2004 | Yeh | |

* cited by examiner

*Primary Examiner*—Lars A Olson
(74) *Attorney, Agent, or Firm*—Rosenberg, Klein & Lee

(57) ABSTRACT

A foam product includes a foam core, a foam buffer and a foam skin. The foam core includes a top surface and a bottom surface and defines at least one recess in an area of the top surface wherein the area is to be imparted during use with respect to other areas of the top surface. The foam buffer is more elastic than the foam core and is securely received in the recess of the foam core. In addition, the foam skin is bonded to and entirely covers a top surface of the foam buffer and the other areas of the foam core.

9 Claims, 2 Drawing Sheets

US 7,670,202 B2

FOAM PRODUCT

CROSS REFERENCE TO RELATED APPLICATION

This is a continuation-in-part of U.S. patent application Ser. No. 11/717,631, filed on Mar. 14, 2007, now U.S. Pat. No. 7,416,461 which is a continuation-in-part of the U.S. application Ser. No. 11/271,920, now U.S. Pat. No. 7,201,625, filed on Nov. 14, 2005.

BACKGROUND OF INVENTION

1. Field of Invention

The present invention relates to a foam product in particular to a foam product with at least one foam buffer locally embedded in a specific area thereof.

2. Related Prior Art

A conventional foam product comprises a foam board (or a foam core) and a skin encasing the foam board. The foam board is made of foam materials. The skin is bonded to the foam board via a bonding medium.

In U.S. Pat. Nos. 5,658,179 and 4,850,913, a sports board comprises a foam core and a film/foam sheet laminate covering the foam core. The foam core is composed of foam materials and shaped into a predetermined figure. The laminate is heat-laminated to all the surfaces of the foam core.

U.S. Pat. No. 5,211,593 discloses a foam-core structure with a graphics-imprinted skin. The foam-core structure and the method for making the same are similar with those of the patents mentioned above, but more complicated.

Additionally, U.S. Pat. No. 4,767,369 discloses a water ski including a core and an outer skin enveloping the core. The water skin further includes struts positioned between a top surface of the core and the outer skin. The struts traverse a longitudinal portion of the ski and provide for two primary functions. First, they provide structural integrity to support foot bindings. Second, they provide torsional rigidity to the ski.

SUMMARY OF INVENTION

The primary object of this invention is to provide a foam product embedded with a foam buffer against external force.

According to the present invention, a foam product includes a foam core, a foam buffer and a foam skin. The foam core comprises a top surface and a bottom surface, and defines at least one recess in a predetermined area of the top surface where a user may impact more frequently than do to other areas of the top surface. The foam buffer has better elasticity than does the foam core and is securely received in the recess of the foam core. In addition, the foam skin is bonded to and entirely covers a top surface of the foam buffer and the other areas of the foam core.

Further benefits and advantages of the present invention will become clear as the description proceeds.

BRIEF DESCRIPTION OF DRAWINGS

The invention will now be elucidated with reference to the following description and accompanying drawings where.

DETAILED DESCRIPTION OF PREFERRED EMBODIMENT

With reference to FIGS. 1-4, description will be given of a foam product according to one embodiment of this invention. The foam product described herein is a bodyboard. However, the foam product according to another embodiment of this invention may also be applied for many other applications, such as sports goods, recreational equipments, cushion, etc. For instance, the foam product may be used in sports goods, e.g. a snowboard, a sailboard or a slider. Alternatively, the foam product may be applied to other cushion, e.g. a bicycle saddle or a luggage cushion.

Figure 1:
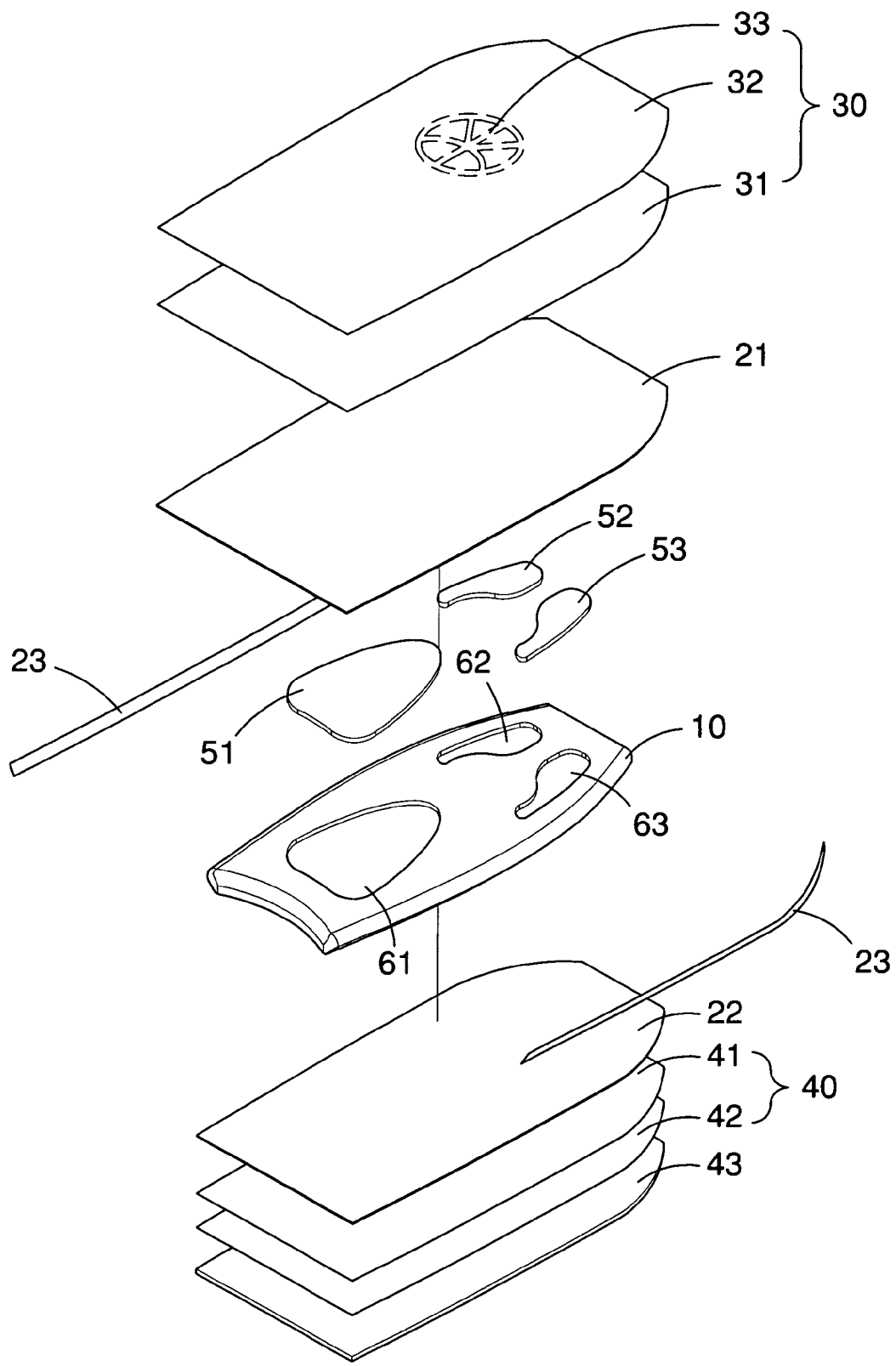
FIG. 1 is an explosive view of a foam product according to the preferred embodiment of the present invention.

Referring to FIG. 1, the foam product includes a foam core 10, a first foam skin 21, a second foam skin 22, a pair of third foam skins 23, a first patterned laminate 30, a plurality of shaped foam buffers 51, 52, 53 and a plastic board including a second patterned laminate 40 and a plastic plate 43.

Figure 2:
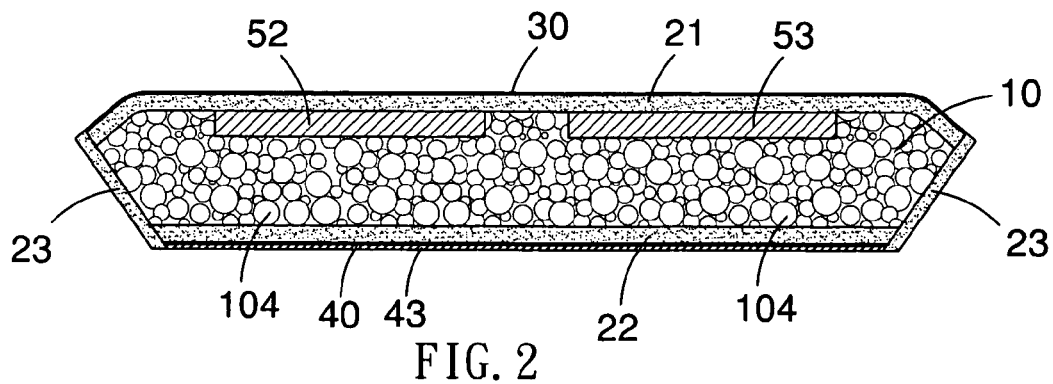
FIG. 2 is a cross-sectional view of the foam product of FIG. 1.

FIG. 2 is a cross-sectional view of the foam product. As shown in FIG. 2, the foam core 10 is composed of a plurality of foam beads 104 bonded with one another tightly. The foam beads 104 are made of foam particles, such as polypropylene (PP), polyethylene (PE), polystyrene (PS) or the like, and those foam beads 104 are pre-foamed.

Figure 3:
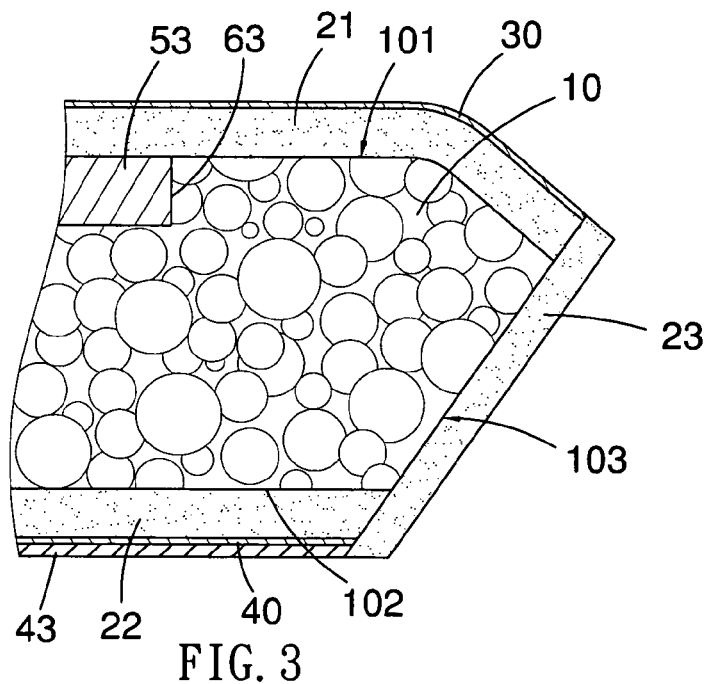
FIG. 3 is a regionally enlarged view of the foam product shown in FIG. 2.

FIG. 3, a regionally enlarged view of FIG. 2, shows that the foam core 10 has a top surface 101, a bottom surface 102 and edges 103. Three recesses 61, 62, 63 corresponding to the three foam buffers 51, 52, 53 are defined in predetermined areas of the top surface 101 of the foam core 10, where the areas are to be impacted during use with respect to other areas of the top surface 101. The foam buffers 51, 52, 53 have better elasticity that does the foam core 10 and are securely received in the recesses 61, 62, 63 of the foam core 10. In other words, the foam buffers 51, 52, 53 of the present invention may be located in any suitable position on the top surface 101 of the foam cores 10 and the preferred position is where the foam product will be exerted or pressed. Each of the foam buffers 51, 52, 53 has a density greater than that of the first foam skin 21, preferably in a range of 1.5 to 12 pcf, so that the foam product is more tactile and even. Similarly, the foam buffers 51, 52, 53 may be made of PE, PP, PS, thermoplastic polyurethane elastomer (TPU) or the like. Preferably, the foam buffers 51, 52, 53 are made of materials selected from those with physical-chemical characteristics similar to those of the foam beads 104 of the foam core 10. As shown in FIG. 1, the foam buffers 51, 52, 53 are disposed on the predetermined areas of the top surface 101 of the foam core 10 where a user may touch or lie prone while surfing. In such a fashion, the foam buffers 51, 52, 53 can protect the foam core 10 from excessive stress and distortion over a long period of time so that the foam product is strong and endurable. In another example, if the foam product is used in a boat or a canoe, one or more foam buffers may need to be placed in other suitable positions so as to match up with the body of the boat or the body of the canoe.

Referring back to FIG. 2, the foam core 10 is entirely encased by the first, second and third foam skins 21, 22, 23. The foam skins 21, 22, 23 are made of the same polyethylene foam with same density and are directly heat laminated to the foam core 10 correspondingly without an intermediate element. More specifically, the first foam skin 21 is fully bonded to and entirely covers top surfaces of the foam buffers 51, 52, 53 and the other areas of the foam core 10. The second foam skin 22 is heat laminated to the bottom surface 102 of the foam core 10. Laterally opposed third foam skins 23 are laminated to the side edges 103 of the foam core 10 respectively. Since the foam buffers 51, 52, 53 are disposed in the recesses 61, 62, 63 of the foam core 10 and bonded with the foam core 10, and also is covered by and bonded with the first foam skin 21, there is no room for the foam buffers 51, 52, 53 to move. Each of the polyethylene foam skins 21, 22, 23 has a density greater than that of the foam core 10 and is in the range of 1.5 to 10 PCF. Hence the foam skins 21, 22, 23 have smoother surfaces, which improve the interfacial bonding strength during the heat lamination between the foam core 10 and the non-foam patterned laminate 30.

In another example where the foam core 10 is made of non-polyethylene foam, such as polystyrene foam or polypropylene foam, and the foam skins 21, 22, 23 and the foam buffers 51, 52, 53 are made of polyethylene foam, the foam skins 21, 22, 23 and the foam buffers 51, 52, 53 are adhesively bonded to the foam core 10 via a bonding medium or an adhesive.

Figure 4:
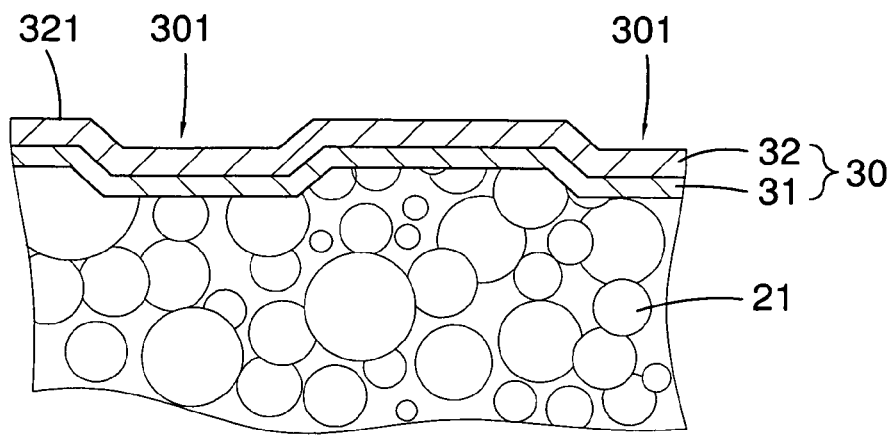
FIG. 4 is a further regionally enlarged view of the foam product shown in FIG. 3.

As shown in FIGS. 1 and 4, the first patterned laminate 30 includes an inner plastic film 31, an outer plastic film 32, and a pattern 33. The inner plastic film 31 has a top joined to the outer plastic film 32 and a bottom directly heat laminated to a top of the first foam skin 21. The pattern 33 may be printed on the top of the inner plastic film 31 or a bottom of the outer plastic film 32 in such a way that the pattern 33 is placed in between the inner and outer plastic films 31, 32. The pattern 33 is thereby protected from direct exposure to the outside of environment. In addition, the outer film 32 is made of a transparent material so the pattern 33 is visible from outside of the outer plastic film 32.

Referring to FIG. 4, the first patterned laminate 30 together with the first foam skin 21 is embossed or cast via a mold to define a plurality of concaves 301 in an exterior surface 321 of the patterned laminate 30. In such a manner, the bonding strength between the patterned laminate 30 and the foam skin 21 is enhanced. Furthermore, the concaves 301 enable the users to grab the foam product with greater tenacity.

Similar to the first patterned laminate 30, the opposed second patterned laminate 40 of the plastic board includes an inner plastic film 41 and an outer plastic film 42 and a pattern (not shown) placed in between the inner and outer plastic films 41, 42. The inner plastic film 41 is laminated to a bottom of the second foam skin 22. The outer plastic film 42 is joined to a bottom of the inner plastic film 41. The plastic plate 43 which is thicker than the outer plastic film 42 is laminated to a bottom of the outer plastic film 42 to enhance wear resistance. In addition, the outer film 42 and the plastic plate 43 are made of transparent materials so the pattern of the second patterned laminate 40 is visible from outside of the plastic plate 43 and is also protected from direct exposure to the outside of environment.

As stated above, the foam core 10 as well as the patterns is protected from erosion by exposure to ultraviolet light, moisture and abrasion. Furthermore, the patterns are visible from outside of the foam product that attracts the users' attentions.

In order to enhance the bonding between the foam core 10, the foam buffers 51, 52, 53 and the first foam skin 21, a bonding medium (not shown) may be either applied to a contact side of the first foam skin 21 or to the top surface 101 of the foam core 10 and sides of the foam buffers 51, 52, 53. Preferably, the bonding medium is formed on the contact side of the first foam skin 21 for bonding the first foam skin 21 to the top surface 101 of the foam core 10. The foam buffers 51, 52, 53 can further comprise additional bonding mediums to bond themselves to the foam core 10. In particular, materials of the bonding mediums are selected according to those of the foam beads 104 of the first foam core 10. In addition, the bonding mediums are made of the materials with excellent bonding ability to the foam beads 104 and the foam buffers 51, 52, 53, such as a multi-property copolymer mixed with PE, PS or the like.

The foregoing description is for purposes of illustration only and is not intended to limit the scope of the protection accorded this invention. The scope of protection is to be measured by the following claims, which should be interpreted as broadly as the inventive contribution permits.

The invention claimed is:

1. A foam product comprising:
    a foam core comprising a top surface and a bottom surface, and defining at least one recess in an area of the top surface wherein the area is to be impacted during use with respect to other areas of the top surface;
    a foam buffer being more elastic than the foam core and being securely received in the recess of the foam core; and
    a first foam skin bonded to and entirely covering a top surface of the foam buffer and the other areas of the foam core.

2. The foam product of claim 1 further comprising a first patterned laminate bonded to the first foam skin wherein the first patterned laminate includes an inner plastic film, an outer plastic film and a pattern laminated between the inner and outer plastic films and being visible from outside of the outer plastic film.

3. The foam product of claim 1 further comprising a second foam skin laminated to the bottom surface of the foam core, wherein the first and second foam skins are made of same material with same density.

4. The foam product of claim 3 wherein the foam core, the foam buffer, the first foam skin and the second foam skin are made of polyethylene foam; and the density of the first foam skin is greater than that of the foam core but less than that of the foam buffer.

5. The foam product of claim 2 further comprising a second foam skin laminated to the bottom surface of the foam core, wherein the first and second foam skins are made of same material with same density.

6. The foam product of claim 5 further comprising a second patterned laminate bonded to the second foam skin wherein the second patterned laminate includes an inner plastic film, an outer plastic film and a pattern laminated between the inner and outer plastic films and being visible from outside of the outer plastic film.

7. The foam product of claim 6 further comprising a plastic plate laminated to the outer plastic film of the second patterned laminate; the plastic plate being thicker than the first patterned laminate; and the pattern of the second patterned laminate being visible from outside of the plastic plate.

8. The foam product of claim 1 further comprising a bonding medium wherein the foam core is made of non-polyethylene foam; and the first foam skin and the foam buffer are made of polyethylene foam and bonded to the foam core via the bonding medium.

9. The foam product of claim 8 wherein the foam core is made from a material selected from the group of polystyrene foam and polypropylene foam.

* * * * *